United States Patent [19]

Yardy

[11] Patent Number: 4,563,058
[45] Date of Patent: Jan. 7, 1986

[54] OPTICAL SIGNAL RECORDER EMPLOYING A TRANSDUCER HAVING AN ADJUSTABLE DICHROIC MIRROR

[75] Inventor: Raymond Yardy, Tucson, Ariz.

[73] Assignee: International Business Machines Corporation, Armonk, N.Y.

[21] Appl. No.: 625,496

[22] Filed: Jun. 28, 1984

[51] Int. Cl.$^4$ .......................... G02B 5/14; G01D 15/14
[52] U.S. Cl. ........................................ 350/166; 248/487; 250/201; 350/633; 350/642; 369/45; 369/110
[58] Field of Search .............. 248/474, 481, 483, 487; 250/201, 202, 570; 346/766, 137; 350/96.2, 166, 172, 600, 612, 632, 633, 634, 486, 642; 358/199, 285, 336, 338, 342; 369/45, 110, 112, 122

[56] References Cited

U.S. PATENT DOCUMENTS

| | | | |
|---|---|---|---|
| 3,357,268 | 12/1967 | Richter | 74/89.15 |
| 3,642,353 | 2/1972 | Field | 350/310 |
| 3,813,170 | 6/1972 | Sears | 356/138 |
| 4,059,841 | 11/1977 | Bricot et al. | 358/128 |
| 4,085,423 | 4/1978 | Tsunoda | 358/128 |
| 4,165,921 | 8/1979 | Kirsch | 350/288 |
| 4,186,991 | 2/1980 | Koide et al. | 350/288 |
| 4,225,873 | 9/1980 | Winslow | 346/76 |
| 4,298,248 | 11/1981 | Lapp | 350/310 |
| 4,339,170 | 7/1982 | Winzer | 350/96.16 |

FOREIGN PATENT DOCUMENTS

| | | | |
|---|---|---|---|
| 2363765 | 11/1975 | Fed. Rep. of Germany | 350/288 |
| 466976 | 2/1914 | France | 350/91 |
| 93114 | 7/1980 | Japan | 350/288 |
| 289465 | 3/1980 | U.S.S.R. | 350/288 |

Primary Examiner—Bruce Y. Arnold
Assistant Examiner—William Propp
Attorney, Agent, or Firm—H. F. Somermeyer

[57] ABSTRACT

A transducer or optical head arrangement for an optical disk recorder includes an adjustably mounted dichroic beam combiner. The adjustments are in two degrees of freedom about a pivot point located near a light beam entry point. The write light source has its emitted beam reflected to the optical disk through a minimum of optical elements. The readback or sensing elements are optically coupled to the optical disk via a light path extending through the beam combiner entering at about the pivot point. The sensing elements include a second light source, an optical detector and a beam splitter. The two light sources are shown as semiconductive laser-emitting different frequency light beams. A four-screw, adjustably-mounted aperture plate retains a partial spherical dichroic beam combiner in a cavity of an optical support.

17 Claims, 3 Drawing Figures

OPTICAL SIGNAL RECORDER EMPLOYING A TRANSDUCER HAVING AN ADJUSTABLE DICHROIC MIRROR

FIELD OF THE INVENTION

Invention relates to optical systems, particularly those optical systems employable as an optical signal recorder.

BACKGROUND OF THE INVENTION

Disk-type optical data recorders have received a lot of attention and development. One of the prime design concerns is to have an optical head that is extremely lightweight, such that it can be radially moved with respect to a rotating optical record member. This feature is extremely important when the optical signal recorders are employed in a data processing environment. In such environments, time is extremely valuable; therefore, anything that reduces access time to recorded signals can have a salutary effect on the operation of the data processing environment.

Another aspect is cost. It is highly desirable that ease of manufacture, ease of maintenance plus low cost be achieved in all apparatus. This goal, combined with the requirement that the optical head be extremely lightweight, presents formidable problems to a designer. Accordingly, it is desired to have an extremely lightweight, easily-adjustable optical transducer for providing a new optical data recorder having enhanced access time at low cost.

It is also desired for purposes of recording integrity that the signals just recorded can be read back for verifying the recording operation. Such operations are often called DRAW for direct-read-after-write. DRAW eliminates waiting one revolution of a disk for verifying recording. With the advent of semiconductive lasers, which are quite light-weight, a two-laser head assembly becomes more feasible for enabling DRAW. The optical components of an extremely small assembly must not only be lightweight but easily adjustable.

DESCRIPTION OF THE PRIOR ART

U.S. Pat. No. 4,085,423 shows a two-laser optical signal recorder having a dichroic mirror interposed between the lasers and the optical record member. The recording laser source emits a collimated recording beam to be transmitted through a polarization-type beam splitter and reflected by a dichroic mirror onto the record member. The reflection by the record member of the recording beam, thence by the dichroic mirror back to the polarization beam splitter, thence to a photodetector for detecting the just-recorded data and for tracking the head to the record track. A second photodetector receives the reflected light beam emitted by the second laser source through the dichroic mirror for detecting focus of the beam at the recording surface of the optical record member. This arrangement requires two photodetectors to operate successfully, which not only adds to the weight of the optical transducer but adds to the cost and adjustment requirements. Accordingly, it is desired to have a simpler two-laser transducer system than that provided by this patent. U.S. Pat. No. 4,225,873 shows two laser mastering machines with a dichroic. It teaches the use of gas lasers which are extremely heavy. A complex set of optical elements are employed to complete the disclosed mastering machine.

U.S. Pat. No. 4,339,170 shows a dichroic element. Dichroic optic elements are notoriously well-known. It is desired to forcibly adjust a dichroic mirror along two axes. The below cited art relates to achieving this goal.

U.S. Pat. No. 4,059,841 shows using a single focus-element detector in an optical recorder for detecting data, focus and for tracking.

Optical support mechanisms for adjusting orientation of mirrors along orthogonal axes have been known; for example, German Pat. No. 2,363,765, published June 26, 1975, shows a mirror mounted on a partial spherical member whose center lies on the mirror surface. The partial spherical member is supported in a ball socket. The mirror is adjusted by a lever which passes through the base of the socket and is held by a spring against the adjustable point at the intersection of two movable stops. Such stops are fitted with wheels that roll on the outer edges of a rectangular frame for enabling adjustments in a Cartesian coordinate system. While this patent shows an adjustment mechanism for two axes adjustment, it appears all of the required components could add to weight beyond what is desired for an optical recorder.

A second reference, U.S. Pat. No. 4,165,921 shows a pivot pin extending through a partial spherical member for providing two axes of adjustments. The pivot pin apparently could interfere with the optical paths desired in a transducer and therefore is not suitable for an optical recorder.

U.S. Pat. No. 4,186,991 shows a mirror that rotates about a closer controlled axis. Again, this item appears to have too much weight and provides only uniaxial adjustment.

French Pat. No. 466,976 (1914) shows a mirrored surface on a half orb, or hemispherically-shaped, member. U.S. Pat. No. 4,298,248 shows a bore for passing a light beam through an optical member that is adjustably mounted. Soviet Union Pat. No. 723,475 shows a ball and socket arrangement for adjusting a planar mirror using springs. This arrangement appears to require more weight and cost than desired for an optical recorder. U.S. Pat. No. 3,642,353 shows a pair of right-angle bores in a part being adjusted. The right-angle bores pass a reflected light beam from an adjustable mirror surface.

U.S. Pat. No. 3,357,268 shows an optical cell having biaxial adjustments. It includes two sets of counteracting diametrically-opposed leveling screws for tilting a reflecting plate about two orthogonal axes. This arrangement is similar to a surveyor's transit. The patent is an improvement over the surveyor's arrangement. The mechanism again has more weight than desired. U.S. Pat. No. 3,813,170 shows a surveyor's instrument having two rotatable hemispheres with mirrored surfaces for aligning two optical paths. The arrangement also has a weight factor.

Accordingly, even though there is a plethora of optical support adjustment mechanisms, none meet the needs of an optical signal recorder as set forth in the background of the invention.

SUMMARY OF THE INVENTION

In accordance with the invention, an adjustable dichroic mirror assembly or beam combiner includes a hemispherical or partially spherically optical member with a substantially planar optical surface having dichroic properties and mounted for relative motion about a pivot point juxtaposed to the planar surface and arranged for receiving a light beam in the vicinity of such pivot point. The support member for the optical member has compatible optical characteristics and adjustably supports the hemispherical optical member through an apertured plate which is adjustably mounted on the support member by four threaded screws to bear the plate down on the hemispherical optical member.

The above-described subassembly is mounted in a lightweight frame at about 45 degrees for ease of access to the threaded screws. A write laser system is disposed to supply an emitted beam to the dichroic beam combiner described above at a frequency such that the beam is reflected by the dichroic member toward an optical record member through a suitable focusing element. A second laser source supplies a light beam having a frequency compatible with the dichroic beam combiner for transmission through the dichroic mirror. A polarization method of beam splitting systems is optically interposed between the beam combiner and the second laser source such that the reflected light of the dichroic passing frequency is reflected to a single detector mounted on the lightweight frame for detecting the recorded signal on the record member, providing tracking signals for the head assembly to track a record track and for determining focus of the beam at the recording surface of the optical record member. The only optics shared by the read and write system are the beam combiner and focuser.

The foregoing and other objects, features, and advantages of the invention will be apparent from the following more particular description of preferred embodiments of the invention, as illustrated in the accompanying drawings.

DETAILED DESCRIPTION

Figure 1:
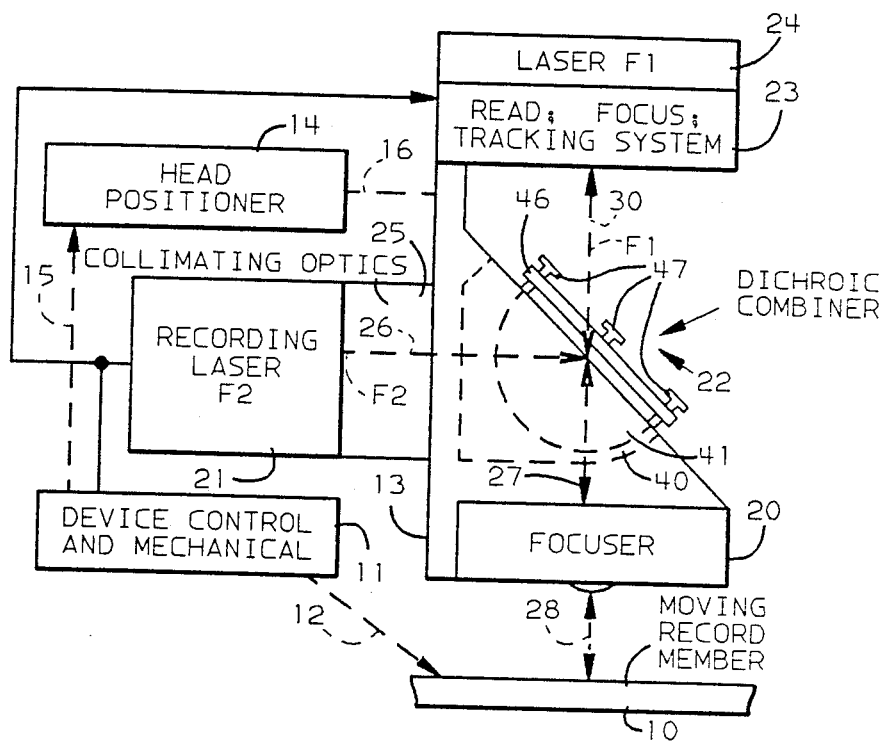
FIG. 1 diagrammatically illustrates an optical signal recorder employing the present invention.

Referring now more particularly to the drawings, like numerals indicate like parts and structural features in the three figures.

A moving record member 10 in the form of a rotatable optical record disk is mounted for a movement and control by a device control and mechanical portions 11 of the illustrated recorder. Dashed line 12 represents the mechanical support and control for record member 10. A movable head or transducer support arm 13 is mounted for a radial movement with respect to the moving record member 10, using known design techniques. Head arm 13 is positioned to a desired radial track position on record member 10 by head positioner 14 as controlled by device control 11, all as indicated by dashed line 15. Such control uses known servomechanism techniques. The mechanical support of head arm 13 by positioner 14 is indicated by dashed line 16.

The transducer or optical head assembly on head arm 13 includes a suitable focusing element 22, which passes a recording laser beam having a frequency F2 from first or write semiconductor laser 21 to record member 10. Laser 21 emits its recording light beam through collimating optics 25, over path 26 to dichroic beam combiner 22, thence as reflected by dichroic beam combiner 22 beam over path 27 through focuser 20, thence path 28 to record member 10. The dichroic combiner 22 includes a dichroic coating as a mirror, as later described, which reflects light having frequency F2. The cross sections of light paths 26 and 27 are sufficient to include all of the significant Gaussian energy components of each light beam.

Figure 3:
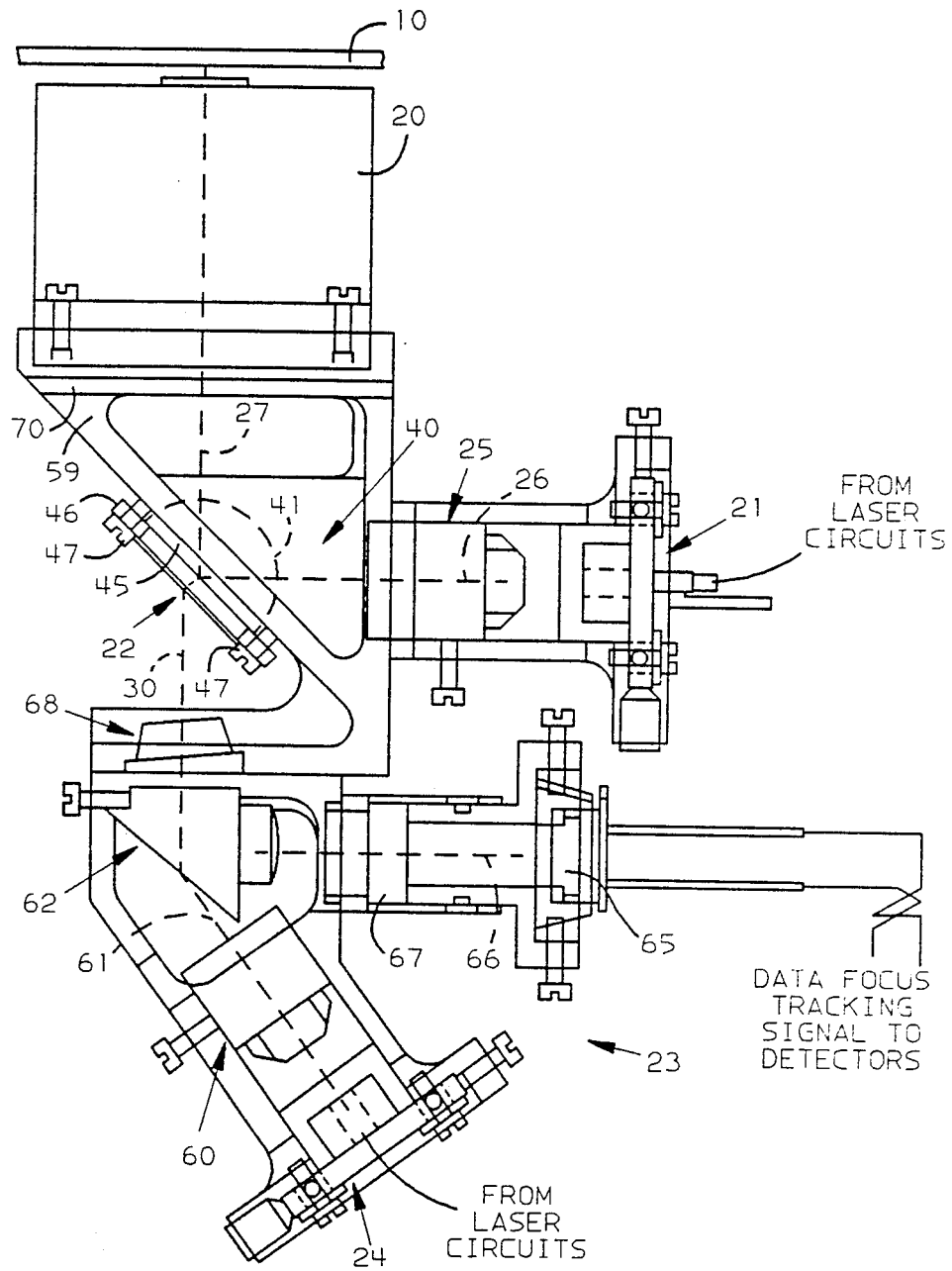
FIG. 3 is a simplified side-elevational view of a transducer assembly mounted on a head arm of the FIG. 1-illustrated recorder.

The reading of recorded information, focusing of the light beam, and a tracking system 23 uses second or read semiconductor laser 24, which emits a light beam having frequency F1, different from the frequency F2, and selected so as to be passed by the dichroic mirror in dichroic combiner 22. The laser 24 emitted light beam goes over path 30 through dichroic combiner 22 thence over path 27 through focuser 20 onto record member 10. The reflected light beam travels over path 28 through focuser 20, thence path 27 through dichroic combiner 22 and again over path 30 back to a detector within the read, focus, tracking system 23 as best seen in FIG. 3, and later described.

Figure 2:
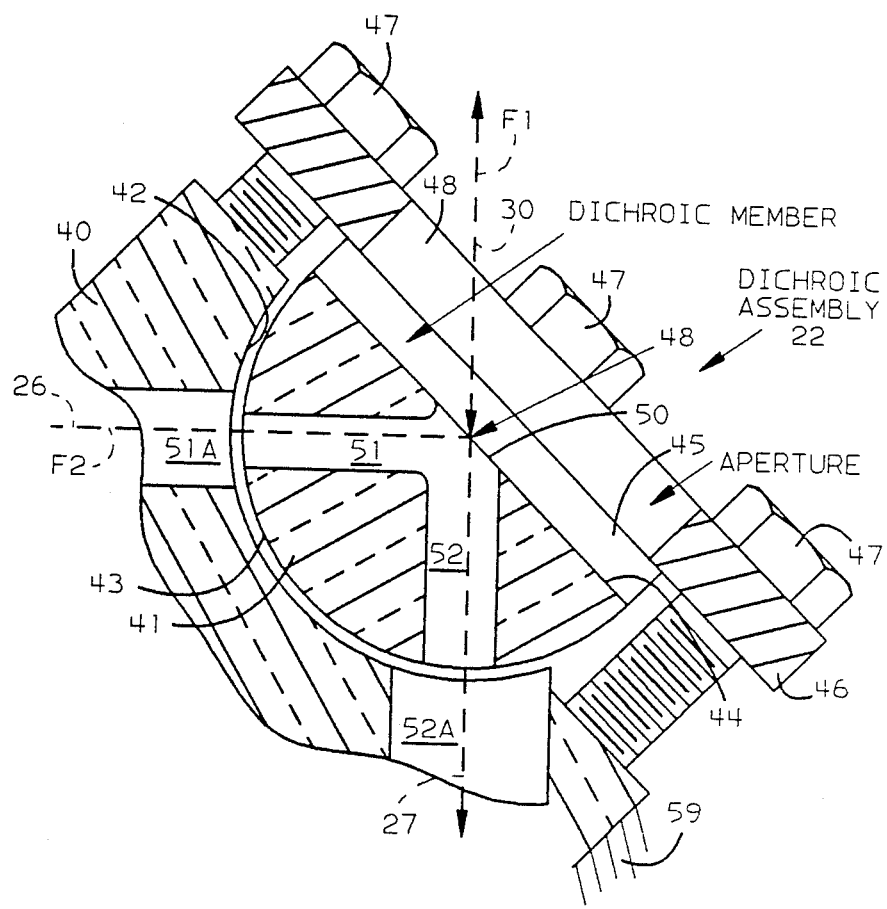
FIG. 2 is a diagrammatic sectional view of a dichroic beam combiner used in the FIG. 1-illustrated recorder.

The details of dichroic beam combiner 22 are best seen in FIG. 2. A support member 40 is included on lightweight frame 59, as later described. A hemispherical optical member 41, also termed a spherical optical member is movably retained in hemispherically-concave, outwardly-opening cavity 42 of support member 40. In one embodiment of the invention, the hemispherical optical member 41 is made of optical glass. Both the convex surface 43 of hemispherical optical member 41 and the concave outwardly-opening cavity 42 of support member 40 have a radius of curvature about single pivot point 48. Light path 30 meets optical member 41 at about pivot point 48. Pivot point 48 also is the apex of the reflection of the F2 light beams following paths 26 and 27. Pivoting hemispherical optical member 41 about pivot point steers the read beam 31 with respect to write beam 51 without any lateral shifting or offsetting of the two beams. The adjustment of hemispherical optical member 41 moves the point of impingement of read beam 30 on record member 10 with respect to the point of impingement of write beam 26 in the record member 10. Therefore, the DRAW function can be precisely timed with respect to the recording operation and can be adjusted to the recording characteristics of record member 10.

Planar surface 44 of optical member 41 supports an ultra-thin dichroic coating 45. The thickness of coating 45 is greatly exaggerated in FIG. 2 for ease of illustration. The coating 45 is sufficiently thin that the pivot point 48 can lie just outside of the coating 45 without altering the operation of the dichroic combiner 22. Apertured retainer plate 46 adjustably secured to optical support member 40 by four threaded screws or bolts 47; two of which are on one axis while the other two are on an axis orthogonal to the first axis for providing two degrees of adjustment. Adjustment of the surface 44 orientation with respect to light path 30 and light path 26 about the two axes enable light beams from the two light paths to be combined in light path 27. Optical member 41 and frame 59 are adjusted for aligning paths 26 and 27 with the light from path 30 proceeding through light path 27 by adjustments of frame 59 and of spherical optical member along two axes as later described. As shown, aperture 48 within retainer plate 46 is substantially the diameter of the partial spherical optical member 41. It need not be so large, the only requirement is that it be sufficiently large to pass most of the significant Gaussian energy components of the light traversing path 30.

In an alternate embodiment to that shown in FIG. 1, member 41 consists of suitable opaque light-weight material and has a pair of right-angle radially-extending bores 51 and 52. Suitable supported dichroic coating 45 is provided at the opening 50 of the two bores 51, 52. The diameter of the preferably circular cylindrical bores 51, 52 should accommodate most of the significant Gaussian energy components of the light beams from lasers 21 and 24.

FIG. 3 illustrates the preferred physical mounting of the above-described components on lightweight frame 59, which is suitably secured to the head arm 13 by a pair of tabs 70 extending into and out of the drawing as viewed in FIG. 3. It is preferred that the tabs 70 be adjustably secured to the head arm 13 for adjusting the entire frame 59 about three axes. The mounting of the previously described components is apparent from inspection of FIG. 3. The read, focus, tracking system 23 is detailed as including a collimator lens 60 for collimating the laser 24 emitted light beam. Dashed line 61 illustrates the light path between laser 24 and a polarization-sensitive beam splitter 62. This beam splitter follows the usual construction practices for optical disk recorders. For obtaining polarization of the reflected light beam from record member 10, with respect to the laser 24 emitted light beam, a quarter-wave plate 68 is optically interposed between beam splitter 62 and beam combiner 22. The light reflected from record member 10 that was emitted from laser 24 is reflected by the polarization-sensitive beam splitter 62, as is well known, along path 66 to optical detector 65. Optical detector 65 and its associated detection circuit can follow usual design practices for optical signal recorders. A cylindrical lens 67 is optically interposed between detector 65 and the beam splitter 62. All of the described light paths are coplanar.

While the invention has been particularly shown and described with reference to preferred embodiments thereof, it will be understood by those skilled in the art that various changes in form and details may be made therein without departing from the spirit and scope of the invention.

What is claimed is:

1. An adjustable dichroic mirror assembly, including, in combination:

a spherical optical member having a substantially planar optical surface means having a pivot point and which permits a light beam of a first frequency to pass therethrough and reflects a light beam of a second frequency different from said first frequency and means in the spherical optical member for internally transmitting light beams to and from a first face of said planar surface at about said pivot point through a spherically convex surface having a first radius about said pivot point and connected to said planar surface means and for transmitting light beams to and from a second face of said planar optical surface means at about said pivot point and which faces opposite to said first face, said optical surface means lying in a plane defined by two orthogonal axes;

an optical support member having compatible optical characteristics to said spherical optical member and having a hemispherically-concave outwardly-opening cavity having said first radius about said pivot point and movably receiving said hemispherical optical member along its spherically-convex surface for pivoting the spherical optical member about said pivot point; and a retainer plate means adjustably secured to said optical support member for independent adjustments along said two axes of said planar surface means for pivoting said spherical optical member in said hemispherically-concave cavity about said pivot point, and said retainer plate means having an aperture coextensive with at least a predetermined portion of said optical surface means for permitting light beams having said first frequency to pass to and from said optical surface means with at least a predetermined portion of its Gaussian energy level.

2. The assembly set forth in claim 1 wherein said planar optical surface means includes an opticlly dichroic layer, and wherein said pivot point is juxtaposed to said optically dichroic layer.

3. The assembly set forth in claim 1 wherein said pivot point is centered at said planar optical surface means with respect to the aperture in said retainer plate means.

4. The assembly set forth in claim 1 wherein four threaded screws are threadingly engaged to said optical support member with two each of said screws being on orthogonal axes of said spherical optical member, respectively.

5. The assembly set forth in claim 1 wherein said internally transmitting means in said spherical optical member consists of optical glass compatible with the optical characteristics of said optical support member.

6. The assembly set forth in claim 1 wherein said spherical optical member consists of optically opaque material and has two orthogonal bores extending from said convex surface to said planar optical surface means which open thereon at said pivot point.

7. The assembly set forth in claim 1 wherein said planar optical surface means is a light beam receptor and transmitter for light of said second frequency, wherein said internally transmitting means has two orthogonal light paths joining at said optical surface means at about said pivot point such that the reflection of said first frequency light beam occurs at said pivot point, and wherein reception and transmission of said second frequency light beam by said planar optical surface means also occur at said pivot point whereby both the first and second frequency light beams share one of said orthogonal light paths.

8. The assembly set forth in claim 7 wherein said first frequency light beam has a lower energy level than said second frequency light beam.

9. The assembly set forth in claim 1 wherein said spherical optical member is a hemisphere with a planar surface at one diameter, wherein said optical surface means is circular and disposed on said planar surface, and wherein said retainer plate means has an aperture slightly smaller than the planar optical surface means such that the retainer plate means bears on the circular periphery of said planar optical surface means.

10. In a lightweight optical head assembly having a focuser for outputting and receiving light beams, and first and second collimated light sources in the assembly for emitting first and second light beams;

the improvement including, in combination:

a frame having an interior portion for mounting optical components, wherein said focuser is mounted on said frame such that a first rectilinear optical path extends outwardly from the frame and toward the interior portion of said frame;

a beam combiner, mounted on the interior portion of the frame, such that it is optically coupled to said focuser via said first rectilinear optical path, wherein a second rectilinear optical path is disposed orthogonally to said first rectilinear optical path and a third rectilinear optical path substantially is aligned with the first rectilinear optical path and extends further into said interior portion of the frame, and wherein said first light source is mounted on said frame for emitting light along said second rectilinear optical path to said beam combiner without traversing any intervening optical elements, for reflection by the beam combiner onto said first optical path;

sensing means mounted on said frame in said further interior portion, wherein said second light source is disposed on the frame for emitting a light beam and receiving a light beam along said third optical path;

means on said frame for adjustably mounting said beam combiner for adjustments about two axes, independently, about a point whereat said third rectilinear optical path joins said beam combiner; and beam selection and reflection means in said beam combiner for reflecting said first light beam from said second to said first rectilinear optical path and for passing said second light beam from said third to said first rectilinear optical path and passing any light from said focuser derived from said second light beam from said first to said third optical path.

11. The assembly set forth in claim 10 wherein: said beam combiner is mounted at about 45 degrees with respect to the first, second and third optical paths;

said sensing means includes a polarization sensitive beam splitter means mounted on said frame and optically coupled to said third rectilinear optical path for transmitting and receiving collimated light to and from said third optical path;

an optical detector means is provided in said sensing means, and mounted on said frame and has a light receptor means pointed to said polarization sensitive beam splitter means, for receiving light along an optical path disposed orthogonally to said third rectilinear optical path supplied by said focuser over said first rectilinear optical path;

said second light source in said sensing means is mounted on said frame at an extremity opposite said focuser and has light emitting means pointed toward said polarization sensitive beam splitter for emitting light thereto for transmission over said third and first rectilinear optical paths.

12. The assembly set forth in claim 11 wherein said optical detector means and said first light source are mounted side-by-side on said frame such that the light received by said optical detector means and said second optical path are substantially parallel and wherein all of said optical paths lie in a common plane.

13. The assembly set forth in claim 12 further including mounting means on said frame immediately adjacent said focuser.

14. In an optical recorder having a record member and an optical head in optical communication with each other, the improvement, in said optical head, comprising:

first and second laser means respectively having high and low power output and operating at first and second frequencies and wherein each laser means emits a beam of light;

a dichroic mirror having first and second oppositely-facing optical surfaces adapted to pass the second frequency and reflect the first frequency light beams and positioned to reflect at a given area on its first surface the first laser emitted beam toward said record member, wherein said first laser is positioned to emit its beam of light to said dichroic mirror second surface, thence through said dichroic mirror and out said first surface in said given area toward said record member; and optical detection means optically coupled to said dichroic mirror for receiving a light beam passing through said dichroic mirror that is reflected from said record member, and including means to: indicate data recorded on said record member, indicate tracking information as to the relationship of the optical head to said record member and indicate focus of the emitted light beams at said record member, said optical detection means being the sole optical detection means in said optical head.

15. The optical head set forth in claim 14 further including adjustment means for adjustably mounting said dichroic mirror with respect to said first laser and said optical detection means such that the dichroic mirror can be precisely aligned with respect to said first laser and said optical detection means;

said adjustment means including, in combination:

a partial spherical member having a planar surface supporting said dichroic mirror and a convex surface with a first radius about a given point and having means for enabling said first and second optical paths to reach the dichroic mirror through the interior of the partial spherical member;

an optical support member having optical properties for passing light therethrough including the light being transmitted over said first and second optical paths and having an outwardly-opening partial-spherical concave cavity with a concave surface with said first radius and movably receiving said partial spherical member such that the given point defines the center of curvature for said concave surface; and means for adjusting the spherical member such that said third optical path ends at said dichroic mirror at said given point.

16. The optical head set forth in claim 15 wherein said means for adjusting includes an apertured plate disposed over said planar surface such that the aperture opens to said dichroic mirror at said given point and wherein there is provided means on said apertured plate threadingly engaged to said optical support member for pivoting said plate independently about two orthogonal axes lying in said plate and hence pivoting said partial spherical member in said cavity for permitting alignment of said given point with said third optical path.

17. In an optical signal recorder having a record member with a large plurality of optically sensible record positions and an optical head member, means for mounting said members for relative movement such that a light beam traveling between said members along a first path-extending along a first axis enables the head member to scan record positions on the record member with a light beam traveling to the record member and to receive a reflected light beam from the record member; the improvement, including in combination:

a dichroic optical means mounted in said head member at 45° to said first axis for intercepting said light beam traveling from said record member along said first path for reflecting a first frequency light beam to a second path orthogonal to said first axis and passing a second frequency light beam to a third path extending along said first axis without reflection;

recording means, including light emitting means mounted in the head member, for emitting a collimated first frequency light beam along said second path to a first face of said dichroic optical means for deflection toward said record member for optically recording signals onto said record member, said first, second and third paths being rectilinear; and sensing means, including light emitting means, for emitting a collimated second frequency light beam to a face of said dichroic optical means opposite to said first face for transmission to said record member and for receiving through said dichroic optical means from said record member a reflection of said second frequency light beam for indicating data recorded on said record member, the focus of said second frequency light beam at said record member and the scanning positional relationship of said members whereby the recording light beam passes through no optical means of the head member traversed by said second frequency light beam except the optical means optically interposed between said dichroic optical means and said record member and all data recovery, tracking and focusing is achieved via said second frequency light beam.

* * * * *